United States Patent [19]
Whiting et al.

[11] Patent Number: 6,034,716
[45] Date of Patent: Mar. 7, 2000

[54] PANORAMIC DIGITAL CAMERA SYSTEM

[76] Inventors: Joshua B. Whiting, 7562 Mary Esther Cir.; Alex C. Barker, 7870 Manzano Dr., both of Sandy, Utah 84093

[21] Appl. No.: 08/993,773

[22] Filed: Dec. 18, 1997

[51] Int. Cl.[7] ..................................................... H04N 7/00
[52] U.S. Cl. ............................................... 348/36; 348/37
[58] Field of Search .................................. 348/36, 37, 39, 348/143, 146, 167–168; 324/76.26; 352/69, 70; 359/725; 396/436; 455/145

[56] References Cited

U.S. PATENT DOCUMENTS

| | | | |
|---|---|---|---|
| 4,674,853 | 6/1987 | Street | 396/330 |
| 4,982,092 | 1/1991 | Jehle | 348/37 |
| 5,049,987 | 9/1991 | Hoppenstein | 348/48 |
| 5,192,969 | 3/1993 | Igarashi et al. | 355/22 |
| 5,349,403 | 9/1994 | Lo | 396/324 |
| 5,650,813 | 7/1997 | Gilblom et al. | 348/36 |
| 5,686,957 | 11/1997 | Baker | 348/36 |
| 5,721,585 | 2/1998 | Keast et al. | 348/36 |
| 5,760,826 | 6/1998 | Nayar | 348/36 |
| 5,790,181 | 8/1998 | Chahl et al. | 348/36 |
| 5,790,182 | 8/1998 | St. Hilaire | 348/36 |

*Primary Examiner*—Vu Le
*Attorney, Agent, or Firm*—Terrance L. Siemens

[57] ABSTRACT

Method and apparatus for recording images at a scene in a panoramic manner enabling subsequent reproduction at remote display devices, and particularly enabling selection of a particular viewing angle at each display device without interfering with selection of viewing angles at other display devices. A stationary camera is operated at the scene being recorded, with a rapidly rotating mirror directing optical images successively from a three hundred sixty degree pattern about the axis of the lens of the stationary camera. Rotational speed is selected such that images are captured at frequencies assuring that reproduction of the images will yield continuous, smooth moving images from one selected viewing angle. The optical images are directed into the camera and then rendered into digital form and entered into memory. Shutter speed or rate and timing of data conversion or entry into memory is controlled to assure capture of optical images repeatedly from several predetermined different viewing angles, as recorded at the camera. Data entered into memory is subsequently transmitted for reproduction at a plurality of remotely located display devices such as CRTs. The operator of each CRT can control his or her CRT to display aspects of images, such as selecting one of the viewing angles, zooming, and changing viewing angles, independently of images displayed at other CRTs.

18 Claims, 5 Drawing Sheets

PANORAMIC DIGITAL CAMERA SYSTEM

BACKGROUND OF THE INVENTION

1. Field of the Invention

The present invention relates to method and apparatus for recording video images, with or without audio, of a three dimensional scene or event in panoramic manner on a digital medium. The novel recording employs a stationary camera and a mirror which sweeps through continuously about three hundred sixty degrees, directing light rays to the camera. The recorded digital images are transmitted to viewers who may select particular views from the full three hundred sixty degree view. Data manipulation is employed by each viewer having a viewing screen, such as a CRT, to select a particular view from the many views available. This enables different viewers to select different views without influencing camera operation. A specific application of the invention is to enable different viewers remotely located from one another to view selected views of televised events. Thus, a widely distributed broadcast can be tailored to suit each viewer by that viewer at his or her premises without restricting viewing options of other viewers.

2. Description of the Prior Art

Many events are televised and similarly made available for viewing by remote audiences. Some events occupy a large stage or area, so that it would be difficult for a conventional still or motion camera to capture all or most aspects of the event being televised or recorded. Illustratively, an event drawing a large crowd of spectators may involve individual actions of many participants. In a sports event conducted by opposing teams, viewers may desire to follow the efforts of different members of the respective teams simultaneously. In some types of events, such as political rallies, reactions of and ideas expressed by the spectators may have significance. In these examples, a full appreciation of the event may be gained only by observing many different aspects of the event simultaneously or in close succession to one another.

Abilities of conventional recording and televising apparatus fall short of offering the full coverage required. Still cameras have been devised to sweep panoramically along a viewing field so as to encompass a wide scene not normally susceptible to being recorded on a single photograph. This type of photography usually requires cooperation by those being photographed for success, and obviously will fail if the event involves more than nominal motion of persons and objects in the viewing field.

Motion cameras can capture individual aspects of an event, but must be refocussed to capture other aspects. In so doing, they lose ability to maintain coverage of any one selected aspect. It would require many motion cameras to successfully cover some large scale events to the satisfaction of a viewing audience.

Even beyond the ability to capture all the necessary views by one or more cameras lies a requirement to selectively retrieve only desired views for broadcast or reproduction for viewing. The prior art has proposed apparatus directed to creating panoramic and three dimensional effects, but these devices fail to enable capture of diverse views and selective reproduction thereof for viewing purposes.

U.S. Pat. No. 5,650,813 issued on Jul. 22, 1997 to David L. Gilblom et al. Discloses a panoramic time delay and integration video camera system. In this invention data may be retrieved independently from a panoramic memory to form various user determined pannable displays. Unlike the present invention, the Gilblomm et al. Patent rotates the entire camera assembly. This leads to unnecessary complications in that mechanical failure is more easily introduced in to the system. The present invention rotates only a mirror assembly to direct light into the lens assembly.

U.S. Pat. No. 5,049,987, issued to Reuben Hoppenstein on Sep. 17, 1991, describes apparatus and method for capturing many views of an object, the views being taken from different vantage points surrounding the object. The captured images are processed so that they may be displayed in relatively conventional manner. By contrast, the present invention operates in a manner such that it, rather than the object being recorded, is centrally located. The purpose of Hoppenstein's device is to create stereoscopic images of a single object. By contrast, the present invention utilizes a single camera to capture images of an event in a manner enabling a viewer to select a particular area at will of the entire field being recorded and to switch at will to other areas, while the camera continues to capture the entire field. In the present invention, the scenery or other subject matter being recorded surrounds the recording device. For this reason, the present invention includes a camera having a mirror arranged to rotate rapidly and continuously three hundred sixty degrees about the axis of the lens of the camera. This step and apparatus for accomplishing the same are absent in Hoppenstein.

U.S. Pat. No. 5,192,969, issued to Shunkichi Igarashi et al. on Mar. 9, 1993, and U.S. Pat. No. 5,349,403, issued to Anthony Lo on Sep. 20, 1994, describe cameras having mirrors enabling stereographic images to be transmitted to photographic film. There is no rotation of the mirror to capture different images in the manner of the present invention. In Lo's device, the camera, rather than a mirror, is rotated.

Hoppenstein and Igarashi et al. allow for magnetic and digital storage of images and reproduction from the digital record. However, the novel method of simultaneously recording images from all views about the camera and selecting individual viewing angles, as practiced in the present invention, are not shown.

In U.S. Pat. No. 4,674,853, issued to Graham S. B. Street on Jun. 23, 1987, method and apparatus for producing stereoscopic images rely heavily upon camera placement. There is no rotating mirror and consequent ability to capture images from a field surrounding the camera. Street's device does not offer viewers the ability to select different views at will of an event, as does the present invention.

None of the above inventions and patents, taken either singly or in combination, is seen to describe the instant invention as claimed.

SUMMARY OF THE INVENTION

The present invention provides apparatus and method enabling capture of a video image of a large field from a vantage point within that field. Illustratively, a sports event could be recorded by the apparatus, with the apparatus located within the viewing field. For a sports event having a playing field from which spectators are excluded, the event being conducted within a stadium, the camera may be located at a point adjacent the playing field, so that images of the sports event and the surrounding stadium, spectators, and other elements lending emphasis to or contributing to the ambiance of the overall event may be recorded. This ability has obvious advantages in recording events wherein plural activities occur simultaneously. For example, an athletic competition wherein several events are staged simultaneously, a circus wherein several acts are being performed simultaneously, and a political rally, wherein spectator reaction has import, are all subject to being recorded in a manner assuring that subtle yet important nuances may be captured in the record.

A further consequence of the invention is that viewers may individually select aspects of the recorded event they wish to observe in detail. A viewer may select a particular performer, area of background scenery, group of spectators, or any other aspect of the event without depriving others of the ability to enjoy their preferred views.

The apparatus includes a camera equipped to convert optical images into digital form, a mirror arranged to be rotated three hundred sixty degrees about the axis of the lens of the camera, a motor for rotating the camera continuously at a predetermined speed, and a memory storage device capable of storing the relatively large amount of digitized information generated by the camera as it rapidly scans and records a scene. In a further aspect of the invention, the apparatus includes telecommunications equipment for distribution of the data, and at least one display screen device. The telecommunications equipment may include pre-existing conventional apparatus such as telephone systems, broadcast satellites, and related facilities. The display screen device may be a cathode ray tube (CRT). Preferably, a control such as a joystick or computer mouse is operably connected to the display screen device.

In operation, the mirror is rotated at a speed sufficiently great to assure perception of continuous vision. That is, frequency of image recording is sufficiently great so that recording appears continuous. Shutter speed is coordinated with rotational speed of the mirror so that a chronological succession of images or views is captured at each angular position of the mirror. The images or views are converted to digital form, resultant data being transmitted to and entered within memory.

Digitized data is retrieved at each display screen. If the user does not change conditions, then he or she will observe a moving record or essentially a live broadcast of a particular segment of the full viewing field of the camera. However, a significant advantage of having digitized the image data is that a viewer can retrieve data selectively. For example, the viewer may wish to view different aspects of the event, switching from one to another. Even views selected from one viewing angle may be manipulated. Illustratively, a viewer may zoom or pan at will.

Preferably, a single camera is located at one constant position, so that a constant reference point is available for digitally connecting subsequent images to produce a dynamic or moving image taken at a constant or unvarying vantage point. This characteristic provides individual viewers with a reference point enabling stationary views to be retrieved selectively by individual viewers. Of course, the viewer may modify view selection so that his or her reproduced viewpoint can wander or scan the scene. Regardless of individual preferences and tolerance for varying the viewing field, a reference is provided enabling manual controls to be employed to select each viewing field from the entire panoramic viewing field produced by the camera.

It will be apparent that the burden of memory demands will most likely cause the invention to be economically exploited only on large scales. For example, transmissions equivalent to national television broadcasts may enjoy the benefits of the invention. In place of radio frequency broadcast of images determined by the camera operator, there is a digitized transmission of all recorded data in any suitable manner. Each consumer having an individual display screen may view the event being televised as he or she wishes by appropriate selection of data with a joystick or a computer mouse being employed for this purpose. Since the full record is digitized, selection at any one display screen does not limit others from selecting different views. In this manner, many diverse views of an event may be recorded by only one camera and the diverse views are selectively available to a wide audience.

Personnel operating the camera need not focus upon the event to determine a presumably desirable vantage point or particular view. Subsequent repetition in displaying of a particular view or of alternative views is immediately available. Individual viewers may select views without being dependent upon camera angle, camera operating personnel, and other arbitrary influences to display a desired view of the event. Also, it is possible to reduce the number of cameras required to capture different views.

The video aspect of recording of an event has been summarized above. It is equally feasible to supplement the video record with an audio record. In one embodiment of the invention, one microphone is provided for each viewing angle of the video recording camera. Therefore, a plurality of microphones are provided, each oriented appropriately for its respective corresponding viewing angle.

Accordingly, it is a principal object of the invention to provide apparatus and method for making diverse views of an event publicly available for reproduction at individual premises for each consumer or member of the public.

It is another object of the invention that diverse views of an event being recorded be selected on demand by individual viewers.

It is a further object of the invention to limit the number of cameras required to achieve plural views of an event.

Still another object of the invention is to assure that images be recorded at a frequency assuring continuity of vision.

An additional object of the invention is to provide an audio record corresponding to each video viewing angle.

Still a further object of the invention is to provide a stationary reference point enabling individual viewers to orient themselves within and to select a viewing field from the entire panoramic viewing field recorded by the camera.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
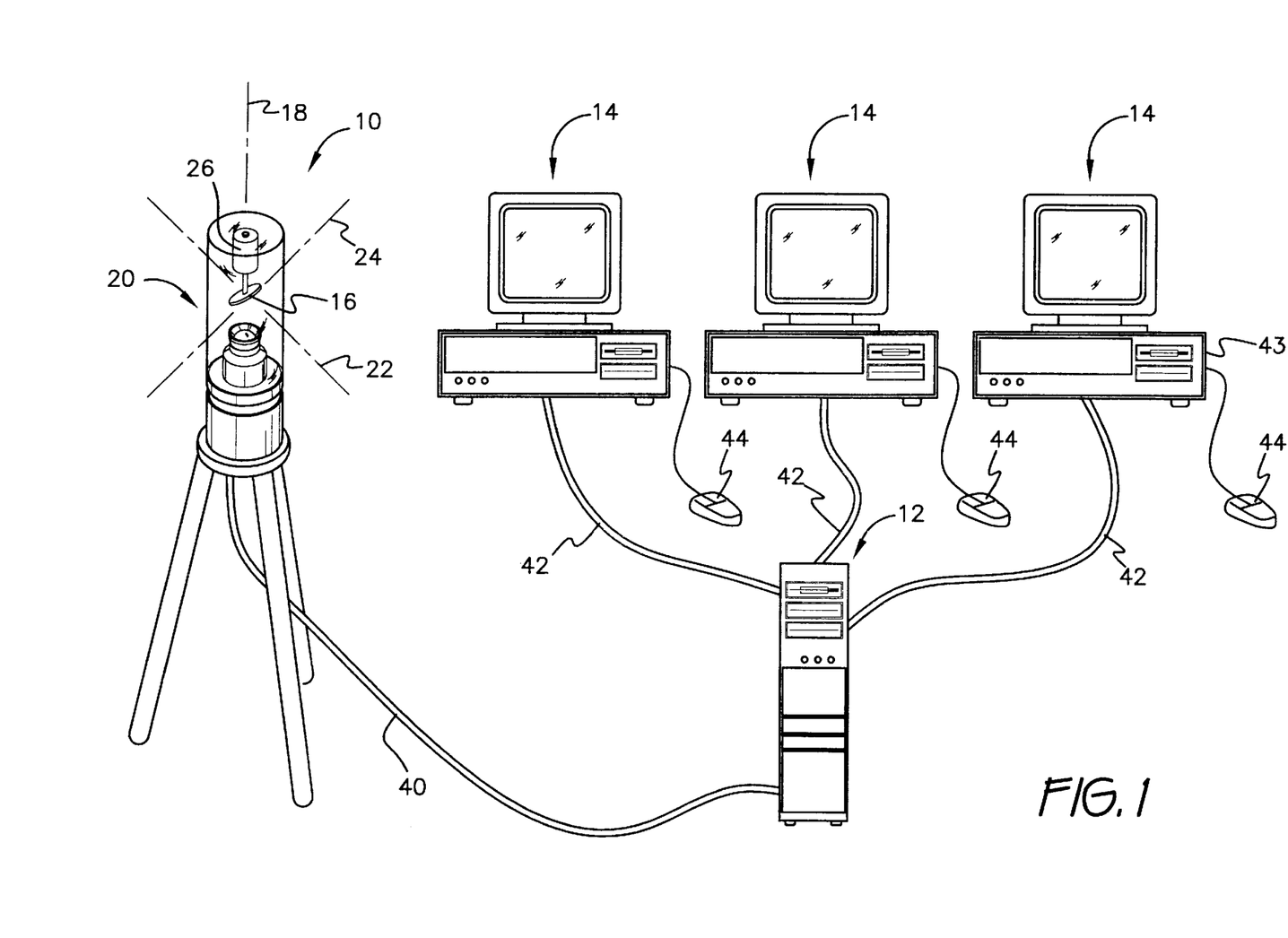
FIG. 1 is a perspective view of the apparatus of the invention.

Turning now to FIG. 1 of the drawings, the principal components of the apparatus required include a camera 10, a data processor 12 which receives data from camera 10, and a plurality of individual display screens 14 which display images based on data obtained from processor 12. Camera 10 has a mirror 16 arranged to reflect light into a vertical axis 18 aligned with aperture 20 of camera 10 from a horizontal plane. The horizontal plane is indicated by axes 22, 24, which together with axis 18 define an orthogonal system. Mirror 16 is arranged at any desired angle, but will usually be arranged to reflect horizontal light rays into aperture 20 when axis 18 is oriented vertically.

Figure 2:
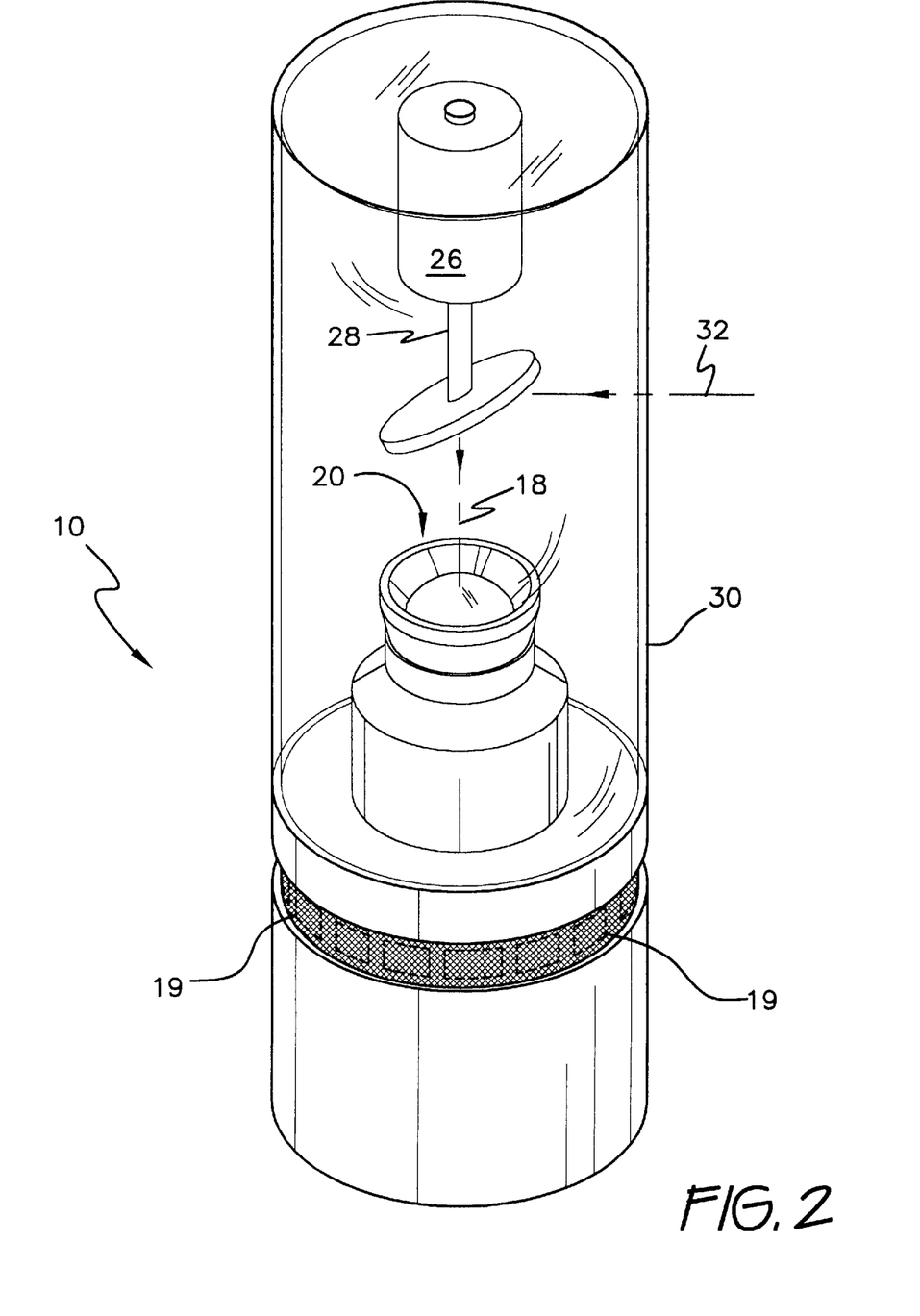
FIG. 2 is a perspective detail view of a component shown at the upper left of FIG. 1, in particular showing a rotatable mirror.

As clearly seen in FIG. 2, mirror 16 is connected to a motor 26 by motor output shaft 28 so that mirror 16 causes light rays impinging radially and inwardly towards axis 18 to be reflected into aperture 20. Mirror 16 is located between motor 26 and camera 10. Rotation of mirror 16 enables plural views to be taken at angular intervals about axis 18. This point should be emphasized. It is important that it is the mirror rotating and, in the contemplated embodiment, only the mirror (apart from rotatable components of the motor) because this feature makes the achievement of a constant reference point manageable. The reference point lies exactly along the axis 18 of the stationary lens within aperture 20. This aids in mapping and aligning the plurality of images in a seamless manner for output. Additionally, it obviates the necessity for pivoting cables and the like, as would be necessary if the entire camera assembly was rotating. Camera 10 is a video image recorder having elements (not separately shown) for capturing optical images by converting optical images into data in digital form. Digital cameras are known, and need not be further described herein. Mirror 16 moves through a predetermined path in repeating cycles to direct optical images from the environment or viewing field of camera 10 to the elements which convert light to digitized data. Sensitive or delicate components of camera 10, such as mirror 16 and aperture 18, are protected by a non-glare housing 30 covering the same. A plurality of microphones 19 are disposed about camera 10 in a manner enabling recording of audio inputs. The audio inputs are also converted to digitized data which is stored with that corresponding to video images, and may be reproduced synchronously or otherwise with the video output when the video or optical images are reproduced.

Figure 3:
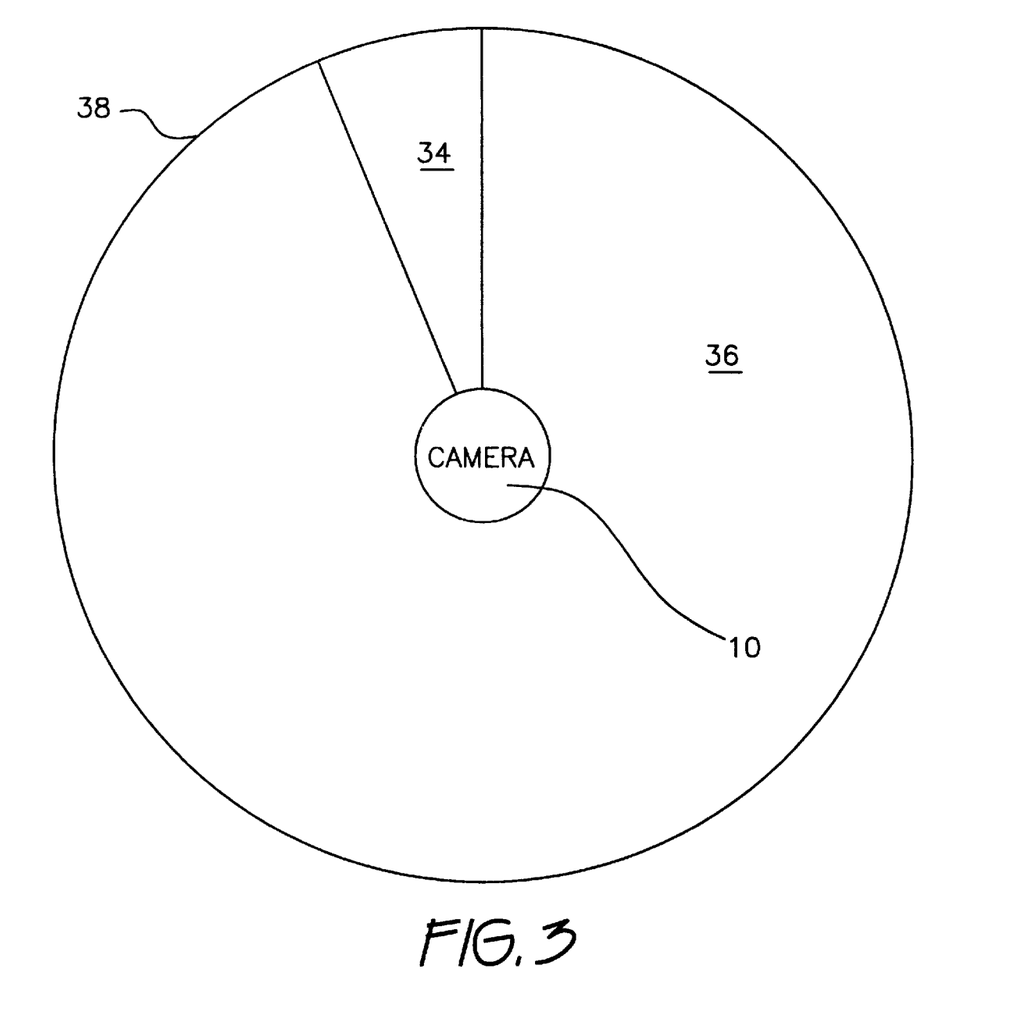
FIG. 3 is a diagram illustrating scope of a single image as it is recorded, taken in top plan view.

Mirror 16 is preferably fixed at a forty-five degree angle to axis 18, although the angle may be adjusted so that the viewing field recorded by camera 10 may be above or below the level of mirror 16. As depicted in FIG. 2, horizontal light rays 32 are reflected into aperture 20 of camera 10. Mirror 16 is rotated in a manner synchronized with the shutter of camera 10, or alternatively with the digitizing elements of camera 10, so that optical images corresponding to still frames of a conventional still camera (not shown) are recorded at predetermined viewing angles. This is shown in FIG. 3. The predetermined path described by mirror 16 assures that an entire viewing area 36 surrounding camera 10 is captured entirely, although in complementing segments, by camera 10. 34 represents a segment which is captured at one moment in time by camera 10. Mirror 16, aperture 20, and one or more lenses (not shown), if required, are configured and dimensioned to assure that segment 34 of viewing field 36 account for a predetermined angular interval of the circumference 38 of viewing field 36.

Figure 4:
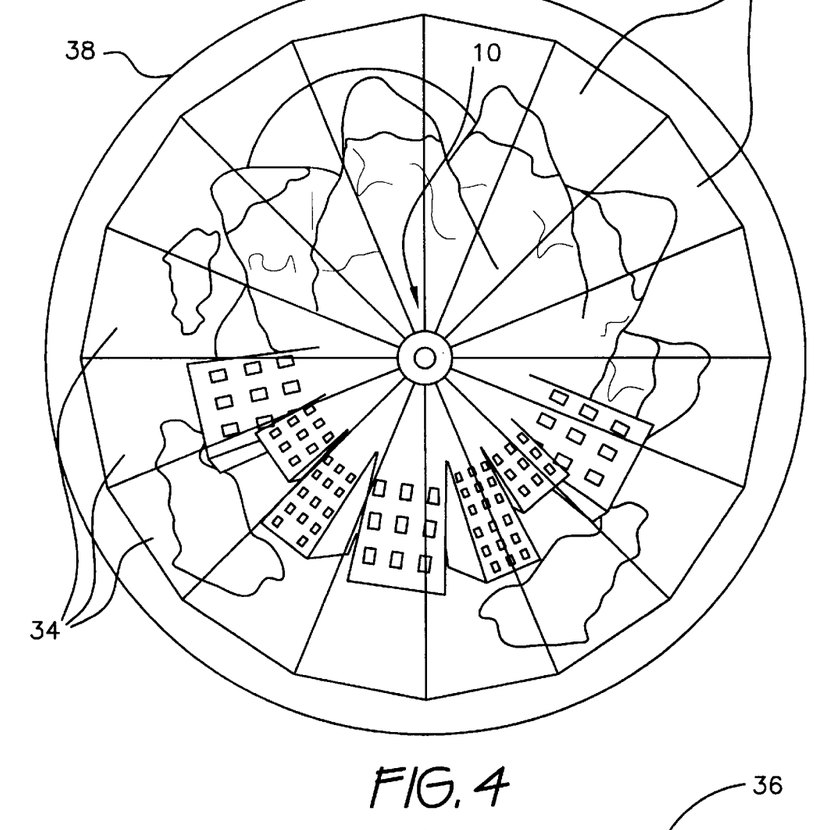
FIG. 4 is a diagrammatic representation of full viewing angle of the camera and ensuing recorded image, as resulting from rotation of the mirror of FIG. 2.

FIG. 4 shows how viewing field 36 relates to scenery located within effective range of camera 10. When timing of image capture is appropriately arranged, many different segments 34 of overall viewing field 36 are repeatedly captured in the recording element of camera 10 with little or no overlap. In the example illustrated in FIG. 4, circumference 38 of viewing field 36 is divided into sixteen segments 34 each accounting for twenty-two and one half degrees of the three hundred sixty degree extent of circumference 38.

Frequency of image capture or formation for each segment is above a threshold below which the unaided human eye would experience flicker, or would perceive discontinuity in a continuously reproduced dynamic display of images on a screen 14. Therefore, the prime mover or motor 26 of the light directing device or mirror 16, is operated at an exemplary rotational speed of twenty-four rotations per second. This results in each segment 34 being recorded twenty-four times per second, so that a total of three hundred eighty-four images are entered into memory each second. Of course, the number of segments 34 may be modified as desired. If increased to twenty-four segments (not shown) each accounting for fifteen degrees of arc of circumference 38, then five hundred seventy-six images would be entered into memory each second. Of course, frequency of image capturing may be increased if desired, but not decreased below the critical threshold described above.

Referring again to FIG. 1, data corresponding to the full number of captured images is transmitted to processor 12 through a suitable cable 40 or other transmission apparatus (not shown). Processor 12 transmits data entered into and retrieved from a memory device (not separately shown) associated with processor 12 to individual screens 14 and associated data manipulation devices such as personal computers 43 through cable 44 or other transmission apparatus (not shown) for subsequent reproduction and viewing. Cables 40, 42 and processor 12 may be essentially similar to servers and transmission apparatus (neither shown) serving the internet. Personal computers 43 preferably have controls, such as a computer mouse 44 disposed to select data in digital form transmitted from the memory device of processor 12. Thus, individual viewers employing the invention may operate in a manner similar to that required to utilize the internet. The images reproduced on screens 14 are essentially equivalent to television broadcasts, as reproduced on television screens (not shown).

Figure 5:
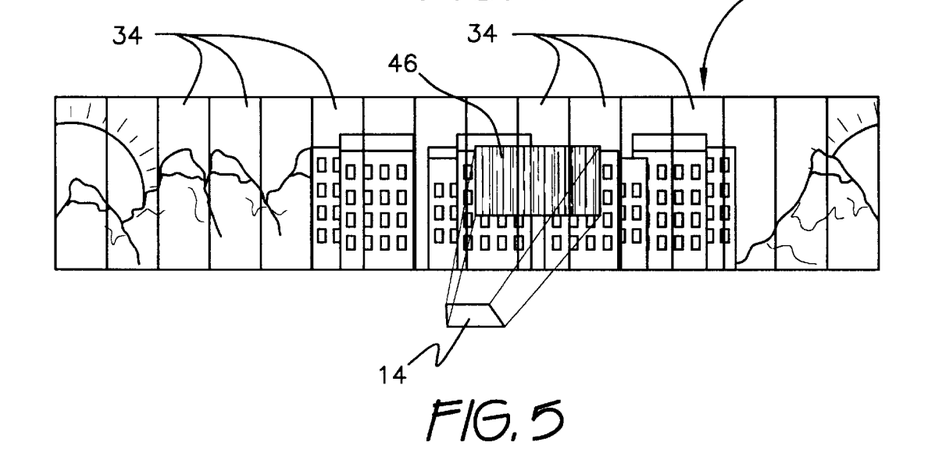
FIG. 5 is a representation of individual views available for viewing, which views may be selected from the recorded scene shown in FIG. 4.

Individual viewers select the actual images, or viewing windows, to be displayed on each respective screen 14 from the data available from processor 12. FIG. 5 illustrates an exemplary viewing window 46 which may be selected from the full viewing field 36. Viewing field 36 is depicted as a row of rectangular segments 34 collectively forming a panoramic view in FIG. 5. Selection is accomplished by employing computer mouse 44 in a generally conventional manner. A person viewing the recorded event may select one or more segments 34 or a viewing window 46 spanning several segments 34, and may, as shown in FIG. 5, elect to view part of one or more segments 34. Cables 42, acting in concert with cable 40 and controls such as computer mouse 44, serve as data distribution apparatus disposed to transmit data stored in the memory device in the form of data signals to remotely located data operated display devices such as screens 14. Segments 34 assist in dividing viewing field 36 into subsets for addressing purposes to enable individual viewers to select a portion of viewing field 36 for reproduction on screen 14.

The invention may also be regarded as a method of recording and reproducing dynamic optical images, utilizing the apparatus described above. As summarized in FIG. 6, the novel method comprises the following steps. In a step 50, a video image recorder such as camera 10 is operated at a scene to be viewed subsequently and remotely from the scene by reproduction of optical images. Preferably, in a step 52, the image recorder is positioned or mounted in a fixed position. This assists selecting views by eyesight rather than by data processing.

Figure 6:
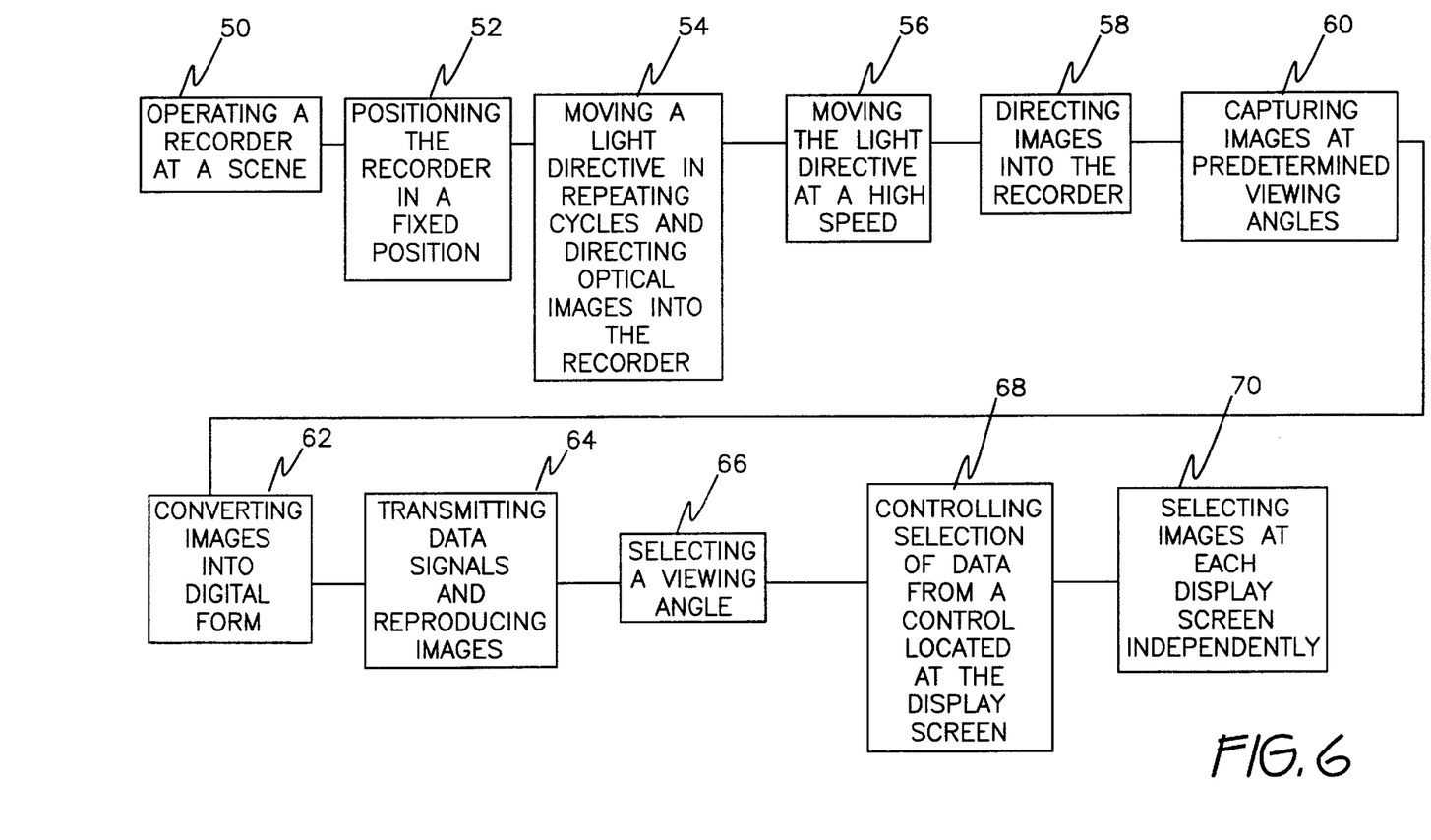
FIG. 6 is a block diagram illustrating steps of a method of practicing the invention, and is read from left to right.

In a step 54, a light directing device such as mirror 16 is moved in a predetermined path in repeating cycles. As depicted in FIG. 2, mirror 16 rotates, thereby collecting light rays reflected from the scenery in a circular pattern. Of course, this arrangement could be modified by, for example, mounting a mirror, lens, optic fiber, or other light gathering and directing apparatus (none shown) on a track or on a mechanical linkage so as to provide a noncircular pattern of image collection.

In a step 56, the light directing device is moved at a sufficiently high speed to assure that flicker and discontinuity are eliminated when the recorded images are reproduced at the same frequency as that achieved during initial conversion of images into fixed digital form. In a step 58, optical images obtained from light reflected from the scene being recorded are directed into the video image recorder with a light directing device so that optical images may be transformed into digital form.

The viewing angles for each optical image captured by rendering in digital form are predetermined by coordinating angular relationship of mirror 16 or its equivalent with respect to the digitizing elements within camera 10. This is shown as step 60. Actual conversion of optical images into digital form is shown as step 62. Step 62 will be understood to include a further step (not shown) of entering data in digital form into memory.

Up to this point, the novel method has generated data in digital form which may subsequently be retrieved for reproducing images. However, this phase of the full method has not yet been described. Reproduction requires that digitized data be transmitted to a suitable display screen, the data then being returned to visible form to reproduce images captured by camera 10. This is shown as step 64.

A significant advantage of the present invention is shown in steps 66, 68, and 70. In step 66, a viewer selects and controls a viewing window 46. This feature enables control not conventionally afforded to a viewer of a broadcast spectacle receiving communications signals from a central broadcast provider. In a refinement of step 66, the viewer makes his decision by appropriate manipulation of a control such as computer mouse 44 located proximate the display screen. A significant consequence of this ability of the novel method is shown as step 70, in that each individual display screen 14 may display images selected independently from yet simultaneously with those appearing on other screens 14. The novel method thus enables a single video recording apparatus, such as camera 10, to record an event or scenery in a manner supporting broadcast or transmission to a wide, scattered audience. Each individual viewing apparatus, such as display screen 14 may be controlled locally to select any aspect of the full record for reproduction at that individual apparatus.

The novel method and apparatus are susceptible to modifications and variations which may be introduced without departing from the inventive concept. For example, it is not necessary that light be reflected by mirror 16. Rather, any suitable light directing device may be employed thereinstead. For example, optic fibers, so called "light pipes", or light transmissive tubes, usually fabricated from a synthetic resin having suitable internal reflection characteristics, and other devices may be substituted for mirror 16.

In an alternative embodiment, the step of entering data into memory may be omitted in favor of transmitting the data for immediate reproduction. Centralized storage of the record is foregone, but immediate reproduction may nonetheless proceed without disruption.

The video image recorder exemplified by camera 10 may take other forms. Similarly, although transmission of data is shown as hard wired by cables 40 and 42, other forms of transmission such as radio frequency and optical may be incorporated into the transmission scheme.

It is to be understood that the present invention is not limited to the embodiments described above, but encompasses any and all embodiments within the scope of the following claims.

We claim:

1. A dynamic, panoramic image processor for recording plural views taken at angular intervals about an axis, comprising a video image recorder disposed to convert optical images selectively directed towards said video image recorder into data in digital form, and a light directing device disposed to move through a predetermined path in repeating cycles and to direct optical images from the environment of said image processor to said said video image recorder such that images are recorded at each one of a predetermined plural number of viewing angles, said light directing device having a prime mover disposed to move said light directing device in said cycles at speeds assuring that images captured at each said viewing angle will be perceived by the unaided eye as continuous and uninterrupted when reproduced at similar frequencies, and wherein said light directing device comprises a motor having rotatable components and a mirror fixed to and rotated by said motor, and wherein only said rotatable components of said motor and said mirror rotate when said panoramic image processor is recording images.

2. The dynamic panoramic image processor according to claim 1, further comprising a memory device disposed to receive and store data in digital form from said image capture means, whereby captured optical images may be stored in said memory device and retrieved for subsequent reproduction and viewing.

3. The dynamic panoramic image processor according to claim 2, further comprising data distribution apparatus disposed to transmit data stored in said memory device in the form of data signals to remotely located data operated display devices.

4. The dynamic panoramic image processor according to claim 3, further comprising a first data operated display device disposed to receive said data signals and generate reproduced optical images corresponding to optical images recorded in digital form in said memory device.

5. The dynamic panoramic image processor according to claim 4, said first display device having a control disposed to select data stored in digital form in said memory device for reproduction as an optical image upon said display device.

6. The dynamic panoramic image processor according to claim 4, further comprising additional data operated display devices each located remotely from other said display devices.

7. The dynamic panoramic image processor according to claim 4, each one of said additional display devices having a respective control disposed to select data stored in digital form in said memory device for reproduction as an optical image on said display device associated with said respective control.

8. A dynamic, panoramic image processor for recording plural views taken at angular intervals about an axis, comprising:

a video image recorder disposed to convert optical images selectively directed towards said video image recorder into data in digital form, and a light directing device disposed to move through a predetermined path in repeating cycles and to direct optical images from the environment of said image processor to said video image recorder such that images are recorded at each one of a predetermined plural number of viewing angles, said light directing device having a prime mover disposed to move said light directing device in said cycles at speeds assuring that images captured at each said viewing angle will be perceived by the unaided eye as continuous and uninterrupted when reproduced at similar frequencies, wherein said light directing device comprises a motor having rotatable components and a mirror fixed to and rotated by said motor, and wherein only said mirror and said rotatable components of said motor rotate when said panoramic image processor is recording images;

a data processor having a memory device disposed to receive and store data in digital form from said video image recorder, whereby captured optical images may be stored in said memory device and retrieved for subsequent reproduction and viewing;

data distribution apparatus disposed to transmit data stored in said memory device in the form of data signals to remotely located data operated display devices;

a plurality of data operated display devices disposed to receive said data signals and generate reproduced optical images corresponding to optical images recorded in digital form in said memory device, each said display device having a control disposed to select data stored in digital form in said memory device for reproduction on said display device.

9. A method of recording and reproducing dynamic optical images, comprising the steps of:

operating a video image recorder at a scene to be viewed remotely by reproduction of optical images;

directing light towards the video image recorder by a light directing device comprising a mirror and a motor having rotatable components;

moving the light directing device in a predetermined path in repeating cycles;

directing optical images from the scene into the video image recorder with a light directing device;

causing only the mirror and rotatable components of the motor to rotate when recording images;

positioning the video image recorder in a fixed position relative to the scene being recorded; and converting images into data in digital form and entering the data into memory.

10. The method according to claim 9, including a further step of successively capturing optical images at predetermined viewing angles.

11. The method according to claim 10, said step of moving the light directing device including the further step of moving the light directing device through the predetermined path at a speed assuring that optical images are captured at each predetermined viewing angle at a frequency assuring that optical images captured at each viewing angle will be perceived by the unaided eye as continuous and uninterrupted when reproduced at similar frequencies.

12. The method according to claim 9, comprising the further step of transmitting data signals corresponding to data stored in digital form in memory and reproducing optical images at a display screen.

13. The method according to claim 12, comprising the further step of selecting optical images from one of the predetermined viewing angles.

14. The method according to claim 12, comprising the further step of controlling data selected for reproduction at one display screen from a control located at the vicinity of the display screen.

15. The method according to claim 9, comprising the further step of transmitting data signals corresponding to data stored in digital form in memory and reproducing optical images from a single transmission at a plurality of display screens located remotely from one another from the transmitted data signals.

16. The method according to claim 15, comprising the further step of selecting reproduced optical images at each display screen independently of selections made at another display screen.

17. A dynamic, panoramic image processor for recording plural views taken at angular intervals about an axis, comprising a video image recorder disposed to convert optical images selectively directed towards said video image recorder into data in digital form; and a light directing device disposed to move through a predetermined path in repeating cycles and to direct optical images from the environment of said image processor to said video image recorder such that images are recorded at each one of a predetermined plural number of viewing angles, said light directing device having a prime mover disposed to move said light directing device in said cycles at speeds assuring that images captured at each said viewing angle will be perceived by the unaided eye as continuous and uninterrupted when reproduced at similar frequencies, wherein said light directing device comprises a motor having rotatable components and fixed components, and a mirror fixed to and rotated by said motor, and wherein said mirror is located between said motor and said video image recorder.

18. The dynamic, panoramic image processor according to claim 17, further comprising a non-glare housing fixed thereto, wherein said housing covers said mirror and said motor and does not rotate when said video image recorder is recording images.

* * * * *